INVENTOR.
WILLIAM A. RAY
BY
Flam and Flam
ATTORNEYS.

Aug. 2, 1960 W. A. RAY 2,947,836
COMBINED RELAY AND HIGH INDUCTANCE COIL
Filed April 22, 1957 3 Sheets-Sheet 2
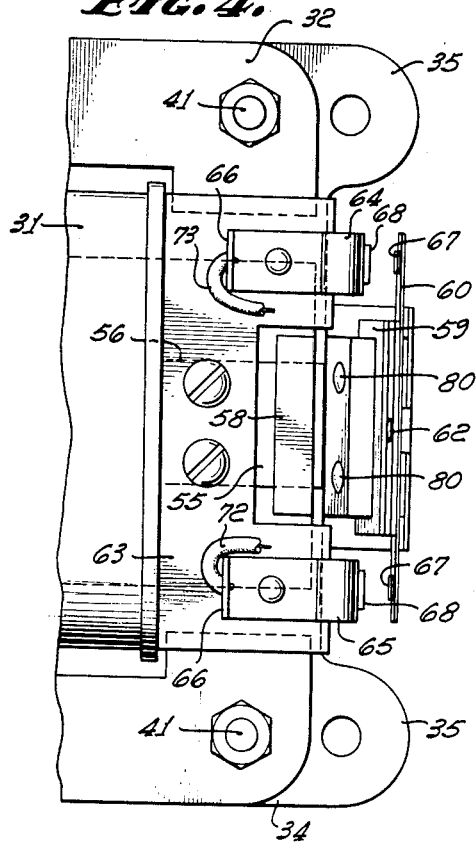
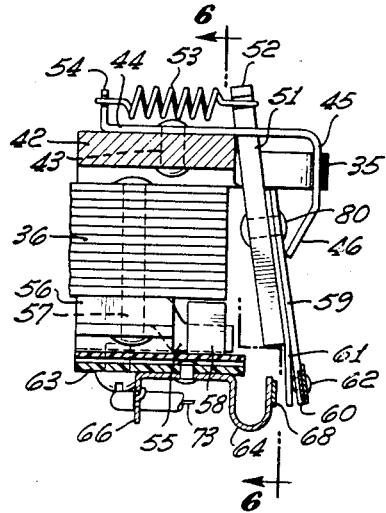
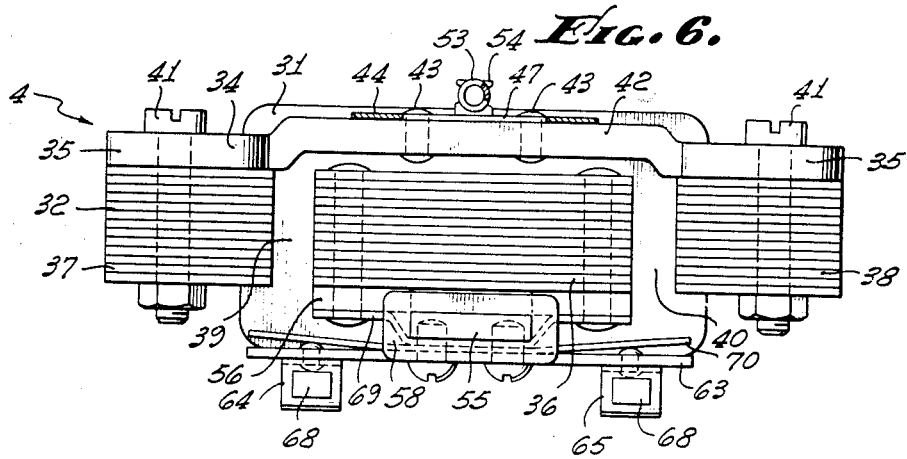
INVENTOR.
WILLIAM A. RAY.
BY Flam and Flam
ATTORNEYS.

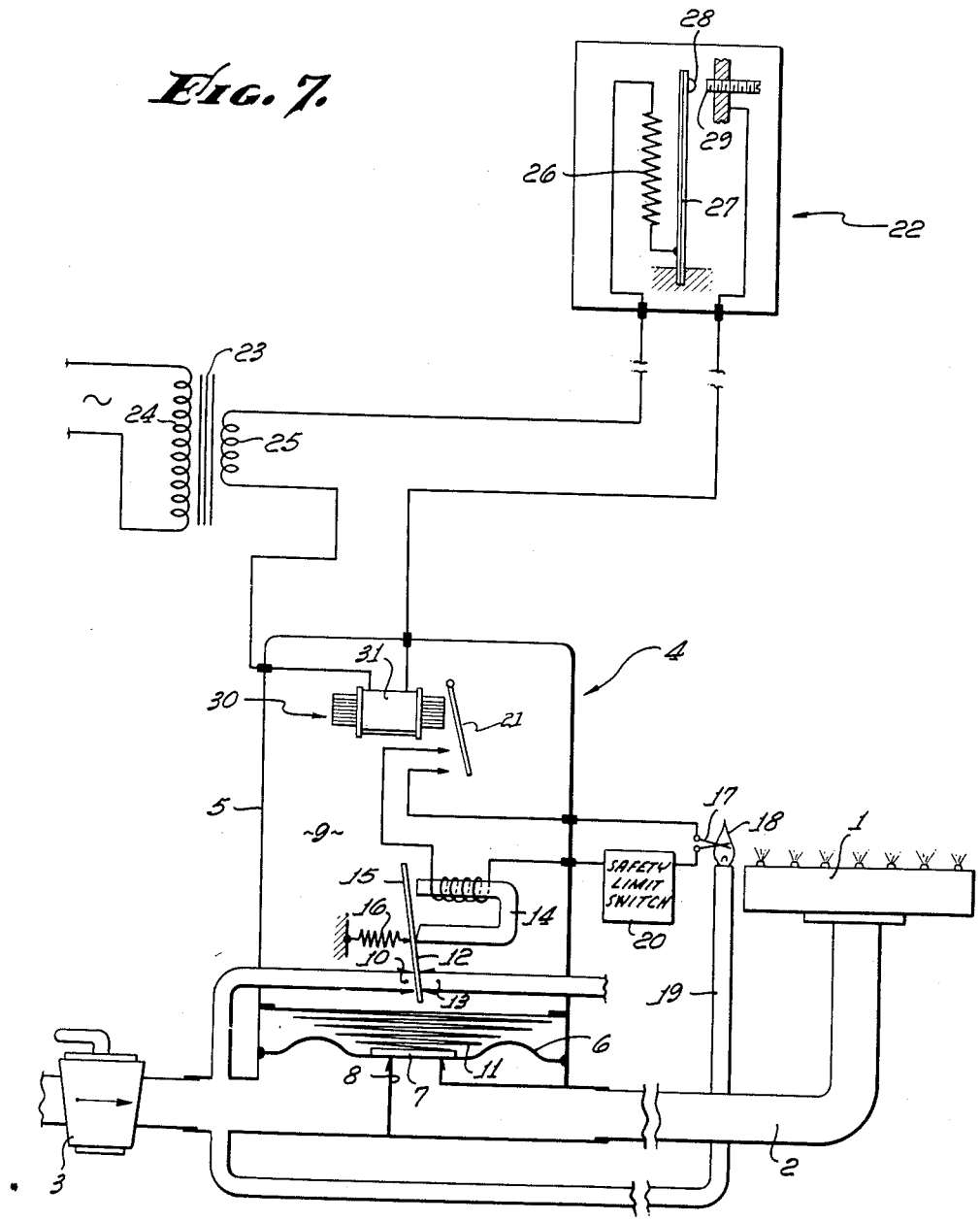

United States Patent Office 2,947,836
Patented Aug. 2, 1960

2,947,836
COMBINED RELAY AND HIGH INDUCTANCE COIL

William A. Ray, North Hollywood, Calif., assignor to General Controls Co., a corporation of California Filed Apr. 22, 1957, Ser. No. 654,298

5 Claims. (Cl. 200—87)

This invention relates to control systems utilizing relays. Particularly it relates to a structure intended to operate as a relay, as well as to provide means for introducing a desired impedance in an electric control circuit.

One use of the invention is in connection with fuel burner control systems. In such systems, it is common to provide a thermostat having a heat anticipator. This heat anticipator serves to heat the thermostat elements when the thermostat demands more heat, causing the thermostat to stop the heating even before the temperature requirements are reached. Such anticipators require a substantial expenditure of electrical energy. Usually a step-down transformer having a standard and safe low secondary electromotive force is provided for supplying this electrical energy.

In order to adapt the circuit to the current requirements of the anticipator, some form of impedance is placed in series with the anticipator. This impedance is preferably mainly reactive so as to reduce the energy loss in it as much as possible.

The thermostat circuit is used to control a valve that in turn controls the flow of fuel to one or more burners, used for space heating, boilers or the like. In order to effect this control, a relay is provided, operative to open the valve when the thermostat requires more heat, and to close the valve when the heat requirements, as modified by the anticipator, are satisfied. The relay heretofore has been provided as a separate equipment, having an operating coil in the thermostat circuit.

It is one of the objects of this invention to simplify such systems by combining the functions of the relay and the impedance, thereby reducing costs.

It is another object of this invention to provide an improved relay structure for controlling the opening and closing of a valve.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 4 is a fragmentary view taken from the bottom, drawn on a still larger scale;

Fig. 5 is an enlarged sectional view taken along a plane corresponding to line 5—5 of Fig. 3;

Fig. 6 is a sectional view taken along a plane corresponding to line 6—6 of Fig. 5; and Fig. 7 is a diagrammatic view of a system in which the invention is incorporated.

Figure 1:
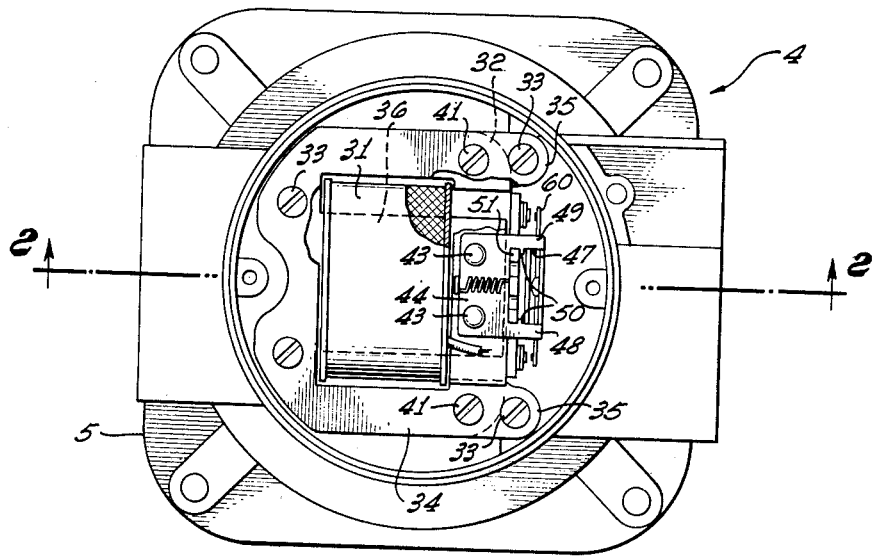
Figure 1 is a plan view of a device incorporating the invention, shown as installed in a valve housing, the drawings being on a slightly enlarged scale.

In Fig. 7 the invention is shown as incorporated in a system for controlling a gas burner 1. This gas burner 1 may be used to provide heating for a space, such as a room, or heating of a boiler, or the like. It is intended to be supplied with gaseous fuel through a conduit 2. This conduit 2 is manually controlled, for example, as by a plug valve 3. This valve is used only when it is desired to shut down the system for an extended period. Interposed in the conduit 2 between the burner 1 and the manually operable valve 3 is a gas pressure operated valve structure 4. Structure 4 is used to open and close conduit 2 automatically, in accordance with demands for heat.

Valve structure 4 includes a fluid-tight casing 5. Adjacent the lower portion of the casing is a flexible wall or diaphragm 6 carrying a valve closure 7. This valve closure 7 cooperates with an inlet opening 8 leading to the burner 1.

The manner of control of this valve structure 4 so that the flexible wall 6 may be urged either to valve opening or closing position has been described in prior patents, such as Patent No. 2,294,693 and Patent No. 2,358,828. It is therefore unnecessary to describe the structure of this valve in detail. It is sufficient to state that when the chamber 9 above the diaphragm or flexible wall 6 is connected to the conduit 2 by the aid of a jet opening 10, the pressure above the diaphragm 6 is sufficient to keep the closure 7 in its closed position. This closing effect is aided by the compression spring 11 mounted in the casing 5.

However, when the jet 10 is closed as by a closure 12, and the chamber 9 is vented through the jet 13, the inlet pressure operating on the lower side of the diaphragm 6 is sufficient to cause the valve closure 7 to move upwardly, for opening the valve 4.

Movement of the closure 12 is effected by electromagnetic means 14. The control of the jet openings 10 and 13 by the aid of the closure 12 is effected by forming the closure 12 as a part of a pivoted armature 15. This armature is urged to the unattracted position indicated, by the aid of a compression spring 16. When the electromagnet coil 14 is energized, the armature 15 is attracted, opening jet 13 and closing jet 10.

The electromagnet coil 14, in this instance, is shown as energized by the aid of a pilot generator 17 adapted to be activated by a pilot flame 18. This pilot flame 18 is supplied with gaseous fuel by a conduit 19. The pilot flame 18 serves to ignite the main burner 2 whenever the valve closure 7 is moved to open position.

The circuit energizing the coil 14 includes as well a safety limit switch 20. Thus, when the temperature or other condition of operation reaches a limit, such as a limiting high temperature or pressure, or the like, the circuit is opened by switch 20, and the armature 15 returns to the unenergized position, causing the valve 4 to close.

The circuit for the coil 14 additionally includes a circuit controller 21. This circuit controller is operated by the aid of a relay mechanism energized whenever a temperature rise causes the contacts of thermostat 22 to close a circuit.

The thermostat 22 is in circuit with a step-down transformer 23, having a primary winding 24 and a secondary winding 25. The transformer 23 is arranged to have its primary 24 connected to a commercial source of alternating current. The secondary winding 25 is so arranged as to provide the standard control electromotive force of twenty-four volts.

The thermostat 22 includes a heating coil 26 in intimate heat transfer relationship to the bimetal 27. This coil 26 provides heat anticipation in a well-known manner. Bimetal 27 may be arranged to respond to room temperature, boiler water temperature, or the like. It carries a contact member 28 adapted to cooperate with an adjustable contact member 29.

The complete circuit for the thermostat structure 22 thus includes the upper terminal of the secondary winding 25, heat anticipator heater 26, bimetal 27, contacts 28 and 29, impedance device 30 and the lower terminal of winding 25.

When the contact members 28 and 29 engage in response to a demand for more heat, the circuit through the impedance device 30 is completed. This impedance device 30 includes the inductance coil 31. The inductance coil 31 is so arranged that it operates the circuit controller 21.

Since the heater 26 requires a current of about 400 milliamperes to 450 milliamperes, and since the resistance of the heater is quite low, it is necessary to reduce the E.M.F. across the terminals of the heater 26, to bring the consumption of current to the desired value. It is for this reason that the impedance device 30 is introduced in series therewith. This impedance device being mainly reactive, utilizes but little energy while at the same time it reduces the E.M.F. available for the heater 26 to the necesary value for obtaining the desired current flow. Accordingly, there is relatively little heat developed by the current flowing through the coil 31.

Figure 2:
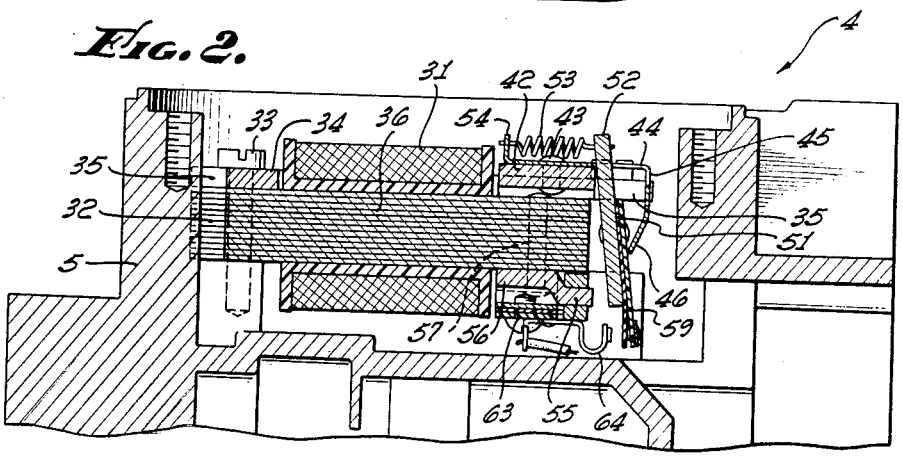
Fig. 2 is a sectional view, taken along a plane corresponding to line 2—2 of Fig. 1.

The laminations 32 upon which the coil 31 is wound are supported at the upper end of the casing 5, as indicated most clearly in Figs. 1 and 2. This is effected by the aid of four screws 33 which engage appropriate threaded apertures formed within the casing 5. Overlying this stack of laminations is a relatively thick metal plate 34 having ears 35 through which two of the screws 33 may extend.

As shown most clearly in Fig. 1, the stack of laminations has three legs. There is a central leg 36 which carries the coil 31. The two side legs 37 and 38 (Figs. 3 and 6) form air gaps, such as 39 and 40, with the central leg 36.

Two bolts 41 (Figs. 3 and 6) serve to hold the stack of laminations firmly together. These bolts serve to hold the laminations together prior to the assembly of the entire stack within the casing 5.

Supported by the core structure are relay elements controlled by the leakage magnetic flux flowing from the end of the center leg 36 for operating the circuit controller 21 shown in Fig. 7. By utilizing this leakage flux, the total impedance of device 30 is relatively only slightly affected by the operation of the circuit controller 21.

The plate 34 has a central raised portion 42 serving as a support for some of the relay parts. Upon this raised portion is fastened, as by rivets 43 (Figs. 2 and 5), an armature stop 44. This armature stop has a downwardly extending portion 45 ending in a slanting projection 46 (see also Fig. 3). The stop 44 is provided with a wide central passage 47 defining the two spaced legs 48 and 49 (Fig. 1). The slot 47 narrows somewhat to define tongues 50 (Fig. 1) upon which an armature structure 51 is tiltably mounted.

Figure 3:
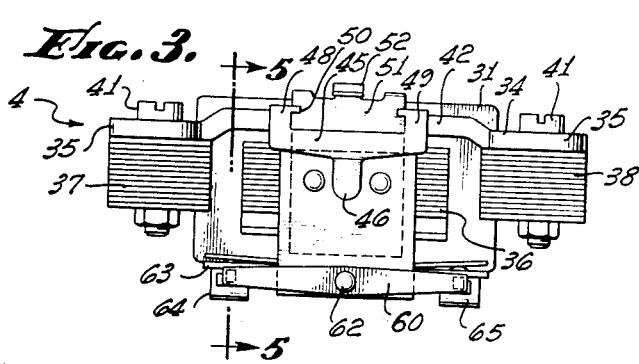
Fig. 3 is an end view of the device, taken from the right-hand side of Fig. 2.

This armature, as shown in Fig. 3, has slots accommodating the inwardly directed tongues 50. Since the slots in the armature 51 are substantially wider than the thickness of the metal forming the member 44, a tilting support is thereby provided for it.

At the upper end of the armature 51 there is formed a projection 52 serving as an anchor for a tension spring 53 (Fig. 5). The other end of the tension spring 53 is anchored to an ear 54 provided at the left-hand end of the member 44 as viewed in Fig. 5.

The unattracted position of the armature 51 is indicated in Figs. 2 and 5.

The armature 51, as shown most clearly in Fig. 3, has a width somewhat less than the exposed area of the central leg 36. However, it has a height or length sufficient to extend completely across this area and for a substantial distance below it. Supported immediately below the exposed area of the leg 36 is a supplemental polar extension 55 (Figs. 2, 5 and 6). This polar extension 55 is integrally formed with a flat plate-like member or bar 56 that is joined as by rivets 57 to the stack of laminations. The extension 55 is offset from bar 56 and is spaced from the lower side of leg 36. Thus this polar extension does not project between any of the polar areas of the three legs 36, 37, 38. Encircling the projection 55 is a short-circuited shading coil 58 made of copper or other good conducting material. This shading coil serves to reduce the variations in the magnetic flux due to leakage from the end of leg 36.

By virtue of the leakage flux flowing through the ends of leg 36 and of polar extension 55, the armature 51 may move in a clockwise direction, as viewed in Fig. 5, to overlie both the legs 36 and the projection 55.

This movement serves to operate the circuit controller 21 (Fig. 7). For this purpose the armature 51 supports a plate 59 made of insulation material, as by the aid of rivets 80 (Figs. 4 and 5). Adjacent its lower end, this plate 59 supports a transverse resilient conducting bar 60 as by the aid of rivet 62. A flexible sheet 61 of insulation material extends between the plate 59 and the armature 51 so as to shield the rivet 62.

Mounted below the stack of laminations is an insulation supporting bar 63. As shown most clearly in Fig. 6, this bar is supported upon a bracket 69 disposed over the plate-like member 56. This bar 63 supports two terminal members 64 and 65. These terminal members have upturned ears 66 by the aid of which conductors 72, 73 may be connected to the terminal members.

The conducting bar 60 is provided with strip contact elements 67 cooperating with corresponding strip contact elements 68 mounted on the members 64 and 65 (see Fig. 6). All of these strip contacts may be firmly welded in place.

Interposed between the insulation plate 63 is a flexible insulation strip 70 (Fig. 6) for shielding the rivets 71 that attach the contact members 64 and 65 to the insulation member 63.

The inventor claims:

1. In a combination relay and high inductance coil: a magnetic core structure including at least two legs defining polar projections; an inductance coil mounted on one of the legs; magnetic means supported adjacent the end of one of the legs for forming another polar extension; an armature pivotally supported on said one of the legs, overlying only said other polar extension; and a circuit controller operated by movement of the armature toward and from said other polar extension; said armature being operated by the flux extending between said other extension and said one of the legs.

2. In a combination relay and high inductance coil: a magnetic core structure including at least two legs defining polar projections; an inductance coil mounted on one of the legs; magnetic means supported adjacent the end of one of the legs for forming another polar extension; a shading coil embracing said other polar extension; an armature pivotally supported on said one leg, overlying only said other polar extension; and a circuit controller operated by movement of the armature toward and from said other polar extension; said armature being operated by the flux extending between said other extension and said one of the legs.

3. The combination as set forth in claim 1, in which said other polar extension is formed by a magnetic member attached to said one of the legs and having an offset portion adjacent the end of the said one of the legs and with the addition of a shading coil on said offset portion.

4. In a combination relay and high inductance coil: a magnetic core structure having a central leg and a pair of legs disposed on opposite sides of the central leg; each of the legs having a polar area; the legs being substantially parallel and of substantially equal lengths; the polar ends of the legs being unconnected; a magnetic bar joined to the center leg adjacent the end of said center leg, the bar having an offset portion forming a polar projection spaced from the polar area of the center leg, said portion being offset in a direction transverse to the three polar areas so as not to extend between any of the three polar areas; a shading coil on said offset portion; an armature extending over only the center polar area and the extension; means mounted on the core for pivotally supporting said armature on that side of the core opposite the one carrying the magnetic bar; stationary contact members carried by the center leg; and cooperating contact members carried by the armature.

5. In a combination relay and high inductance coil: a magnetic core structure having a central leg and a pair of legs disposed on opposite sides of the central leg; each of the legs having a polar area; the legs being substantially parallel and of substantially equal lengths; the polar ends of the legs being unconnected; a magnetic bar joined to the center leg adjacent the end of said center leg, the bar having an offset portion forming a polar projection spaced from the polar area of the center leg, said portion being offset in a direction transverse to the three polar areas so as not to extend between any of the three polar areas; a shading coil on said offset portion; an armature extending over only the center polar area and the extension; means mounted on the core for pivotally supporting said armature on that side of the core opposite the one carrying the magnetic bar; said pivotally supporting means having opposed tongues engaging slots in the edges of the armature; stationary contact members carried by the center leg; and cooperating contact members carried by the armature.

References Cited in the file of this patent

UNITED STATES PATENTS

| | | |
|---|---|---|
| 1,774,130 | Chapman et al. | Aug. 26, 1930 |
| 2,158,841 | Stevens | May 16, 1939 |
| 2,159,837 | Babb et al. | May 23, 1939 |
| 2,162,126 | Shaw | June 13, 1939 |
| 2,231,974 | Van Valkenburg | Feb. 18, 1941 |
| 2,265,294 | Lange | Dec. 9, 1941 |
| 2,286,296 | McGrath | June 16, 1942 |
| 2,463,333 | Van Valkenburg | Mar. 1, 1949 |
| 2,575,812 | Hufnagel | Nov. 20, 1951 |
| 2,619,569 | Savage | Nov. 25, 1952 |
| 2,798,916 | Fisher | July 9, 1957 |
| 2,848,663 | Kelto et al. | Aug. 19, 1958 |